(12) United States Patent
Jacob

(10) Patent No.: US 11,065,994 B2
(45) Date of Patent: Jul. 20, 2021

(54) QUICK-ATTACHMENT ASSEMBLY FOR ATTACHING A SEATBACK FRAME TO A VEHICLE FRAME AND SELECTED DETACHMENT THEREFROM

(71) Applicant: Ford Global Technologies, LLC, Dearborn, MI (US)

(72) Inventor: George Jacob, Kollam (IN)

(73) Assignee: Ford Global Technologies, LLC, Dearborn, MI (US)

(*) Notice: Subject to any disclaimer, the term of this patent is extended or adjusted under 35 U.S.C. 154(b) by 19 days.

(21) Appl. No.: 16/736,190

(22) Filed: Jan. 7, 2020

(65) Prior Publication Data

US 2020/0139869 A1 May 7, 2020

Related U.S. Application Data

(62) Division of application No. 15/701,703, filed on Sep. 12, 2017, now Pat. No. 10,562,428.

(51) Int. Cl.
| | |
|---|---|
| *B60N 2/90* | (2018.01) |
| *B60N 2/20* | (2006.01) |
| *B60N 2/22* | (2006.01) |
| *B60N 2/68* | (2006.01) |
| *B60N 2/015* | (2006.01) |
| *B60N 2/36* | (2006.01) |

(52) U.S. Cl.
CPC ............ *B60N 2/929* (2018.02); *B60N 2/015* (2013.01); *B60N 2/20* (2013.01); *B60N 2/22* (2013.01); *B60N 2/36* (2013.01); *B60N 2/686* (2013.01)

(58) Field of Classification Search
CPC ........ B60N 2/929; B60N 2/933; B60N 2/015; B60N 2/20; B60N 2/22; B60N 2/36; B60N 2/686
See application file for complete search history.

(56) References Cited

U.S. PATENT DOCUMENTS

| | | | |
|---|---|---|---|
| 3,975,050 A | 8/1976 | McKee | |
| 4,583,782 A | 4/1986 | Mikuniya | |
| 5,263,763 A | 11/1993 | Billette | |
| 5,273,336 A | 12/1993 | Schubring et al. | |
| 5,833,203 A | 11/1998 | Denis et al. | |
| 6,293,604 B1 | 9/2001 | Williams et al. | |
| 6,588,846 B2 | 7/2003 | Arrenberg et al. | |
| 7,581,793 B2 | 9/2009 | Hartmann et al. | |
| 7,905,549 B2 | 3/2011 | Lake et al. | |
| 8,678,496 B2 | 3/2014 | Zorine | |
| 10,562,428 B2 * | 2/2020 | Jacob | B60N 2/20 |
| 2013/0341951 A1 | 12/2013 | Asai et al. | |

FOREIGN PATENT DOCUMENTS

DE    102005062056    6/2007

* cited by examiner

*Primary Examiner* — Philip F Gabler
(74) *Attorney, Agent, or Firm* — David Coppiellie; Price Heneveld LLP

(57) ABSTRACT

A vehicle seat attachment includes a riser bracket of a vehicle frame. A pin is biased through the riser bracket to a securing position. A seat bracket has an angled channel that extends to a securing aperture, wherein slidable engagement of the angled channel with the pin is configured to bias the pin away from the securing position until the pin reaches the securing aperture wherein the pin returns to the securing position.

10 Claims, 9 Drawing Sheets

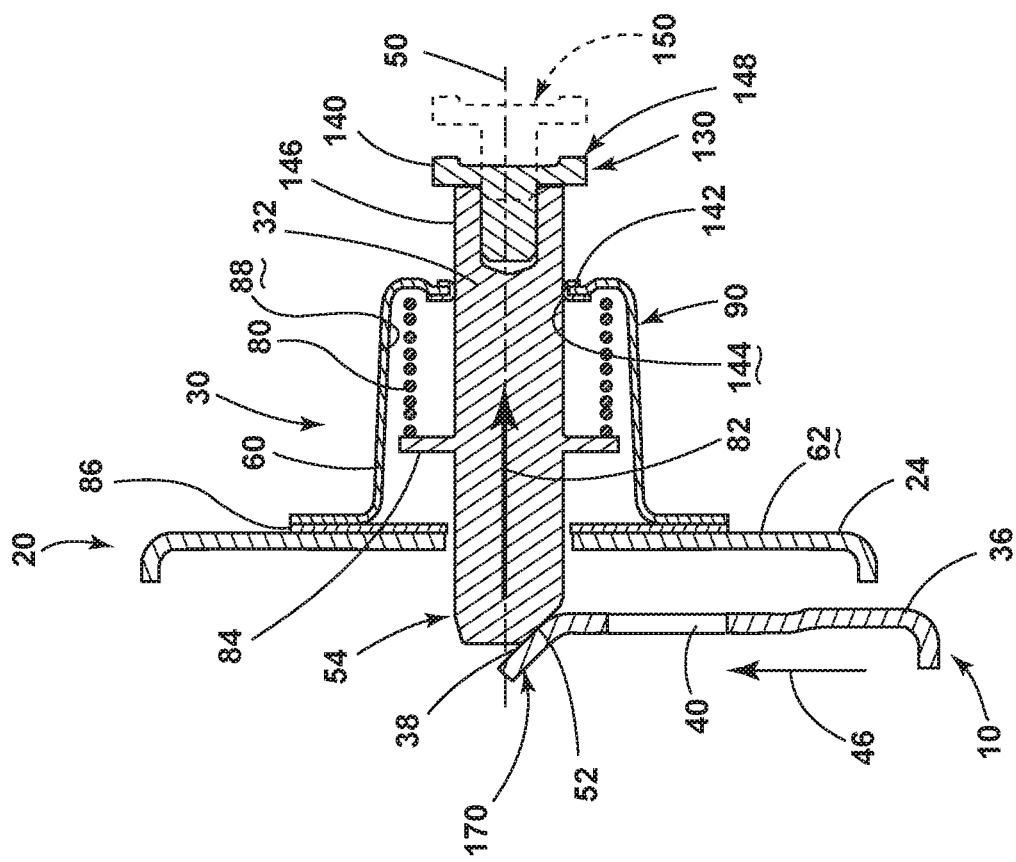
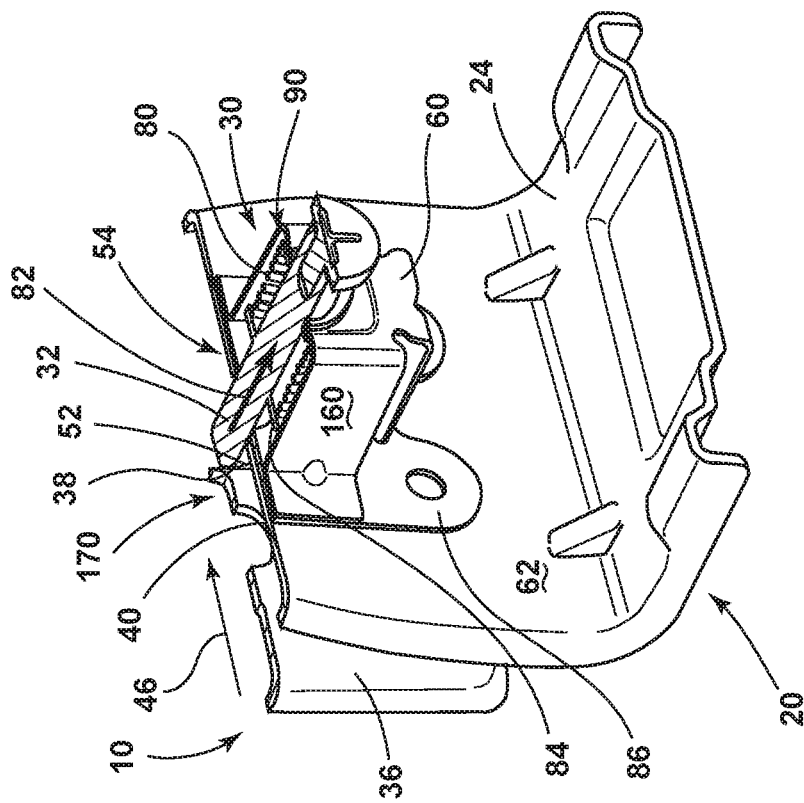
FIG. 9
FIG. 8

QUICK-ATTACHMENT ASSEMBLY FOR ATTACHING A SEATBACK FRAME TO A VEHICLE FRAME AND SELECTED DETACHMENT THEREFROM

CROSS-REFERENCE TO RELATED APPLICATION

The present application is a divisional of U.S. patent application Ser. No. 15/701,703 filed Sep. 12, 2017, entitled QUICK-ATTACHMENT ASSEMBLY FOR ATTACHING A SEATBACK FRAME TO A VEHICLE FRAME AND SELECTED DETACHMENT THEREFROM, the entire disclosure of which is hereby incorporated herein by reference.

FIELD OF THE INVENTION

The present invention generally relates to vehicle seating, and more specifically, a biased mechanism for attaching a seatback frame to a riser bracket for a vehicle frame and also for detaching the seatback frame therefrom.

BACKGROUND OF THE INVENTION

During manufacture of a vehicle, vehicle seating is secured to a vehicle frame. Attachment of the vehicle seat to the frame can include various welding and fastening operations to provide a secure attachment between the components of the vehicle. The attachment of the vehicle seat to the vehicle frame also includes a pivoting engagement to allow for reclining and inclining of a seatback relative to the vehicle frame.

SUMMARY OF THE INVENTION

According to one aspect of the present invention, a vehicle seat attachment includes a riser bracket of a vehicle frame. A pin is biased through the riser bracket to a securing position. A seat bracket has an angled channel that extends to a securing aperture, wherein slidable engagement of the angled channel with the pin is configured to bias the pin away from the securing position until the pin reaches the securing aperture wherein the pin returns to the securing position.

Embodiments of this aspect of the invention can include any one or combination of the following features:
  the pin is rotationally fixed relative to the riser bracket
  the pin is operable only in an axial direction along a longitudinal axis of the pin
  the pin includes an angled end that is configured to slidably engage the angled channel of the seat bracket
  a housing attached to a first side of the riser bracket, wherein the housing rotationally secures the pin relative to the riser bracket
  an axial ridge of the pin that engages the housing to rotationally secure the pin within the housing
  a biasing spring disposed within the housing, wherein the biasing spring biases the pin to the securing position.
  the biasing spring defines a compressed state when the pin is in the securing position
  the pin includes a grasping end that is opposite the angled end, wherein the grasping end is disposed outside of the housing
  the pin includes a stopping flange that defines the securing position of the pin
  the housing includes a base plate that is secured to the riser bracket
  the base plate, the housing, the pin and the biasing spring are a mechanical assembly that is attached to the riser bracket as a single unit
  engagement between the seat bracket and the riser bracket via the pin defines a pivot connection of the seat bracket at the riser bracket According to another aspect of the present invention, a vehicle includes a seatback frame slidably operable with a vehicle frame to define an attached position. A pin is biased toward a securing position through the vehicle frame. When the seatback frame is moved toward the attached position, a biasing portion of the seatback frame axially biases the pin away from the securing position. In the attached position, the pin is in the securing position and extends through the biasing portion.

Embodiments of this aspect of the invention can include any one or combination of the following features:
  the biasing portion includes an angled channel that extends from a mouth to a securing aperture
  the attached position is further defined by the pin disposed within the securing aperture
  the pin is operable only in an axial direction along a longitudinal axis of the pin
  the pin is rotationally fixed relative to the vehicle frame
  the pin includes an angled end that is configured to slidably engage the biasing portion of the seatback frame
  a housing attached to a first side of a riser bracket of the vehicle frame, wherein the housing rotationally secures the pin relative to the riser bracket
  an axial ridge of the pin that engages the housing to rotationally secure the pin within the housing According to another aspect of the present invention, a method for attaching a vehicle seat to a vehicle frame includes attaching a pin-biasing assembly to a riser bracket of the vehicle frame. The method also includes sliding a seatback frame against the riser bracket toward an attached position, wherein slidable operation of the seatback frame engages an angled channel of the seatback frame with an angled end of a rotationally-fixed pin for the pin-biasing assembly and biases the pin away from a securing position. The method also includes placing the seatback frame in the attached position, wherein the pin is based into the securing position and extends through a securing aperture of the seatback frame.

Embodiments of this aspect of the invention can include any one or combination of the following features:
  the pin can be removed from engagement with the seatback frame through operation of a grasping end
  the seatback frame is configured to be engaged and disengaged from the riser bracket and the pin-biasing assembly by hand and without the use of tools These and other aspects, objects, and features of the present invention will be understood and appreciated by those skilled in the art upon studying the following specification, claims, and appended drawings.

BRIEF DESCRIPTION OF THE DRAWINGS

In the drawings.

FIG. 8 is a cross-sectional perspective view of the seat attachment assembly of FIG. 6 showing the seatback frame being moved into an attached position;

FIG. 9 is a cross-sectional view of the seatback frame assembly of FIG. 7 showing the seatback frame being moved into the attached position;

DETAILED DESCRIPTION OF THE PREFERRED EMBODIMENTS

Figure 1:
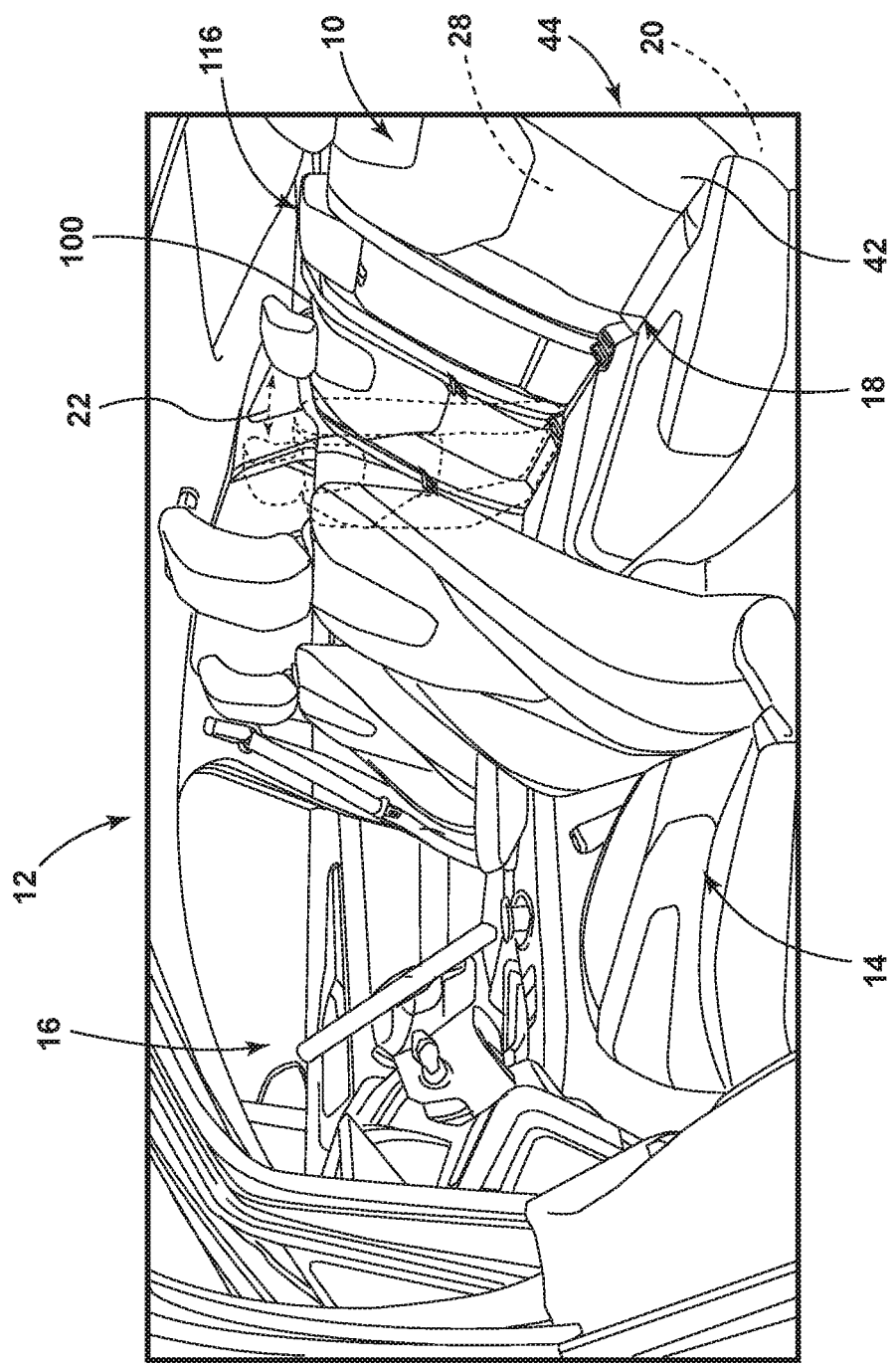
FIG. 1 is a side perspective view of a passenger compartment for a vehicle having a rear seat incorporating an aspect of the seat attachment assembly.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

As exemplified in FIGS. 1-12, reference numeral 10 generally refers to a seatback for a vehicle 12 that includes a plurality of seating positions 14 within a passenger cabin 16. The rear seating position 18 within the passenger cabin 16 can include a seatback 10 that is attached to a vehicle frame 20. This seatback 10 is typically rotationally operable between a plurality of rotational positions 22. To allow for the movement of the seatback 10 between this plurality of rotational positions 22, the seatback 10 is attached to a riser bracket 24 of the vehicle frame 20 at a pivot connection 26. This pivot connection 26 is created through an attachment between the seatback frame 28 and the riser bracket 24 using a seat attachment assembly 30. According to various aspects of the device, the seat attachment assembly 30 is attached to the riser bracket 24 for the vehicle frame 20. A pin 32 is biased through the riser bracket 24 and is biased toward a securing position 34 of the pin 32. A seat bracket 36 for the seatback frame 28 includes an angled channel 38 that defines a sloped surface that extends to a securing aperture 40. Slidable engagement 46 of the angled channel 38 with the pin 32 is configured to bias the pin 32 away from the securing position 34. The pin 32 is biased away from the securing position 34 until the pin 32 reaches the securing aperture 40 of the seat bracket 36. When the pin 32 is aligned with the securing aperture 40, the pin 32 returns to the securing position 34 and extends through both the riser bracket 24 and the seat bracket 36. This attachment between the seat bracket 36, the riser bracket 24 and the pin 32 extending therethrough forms the pivot connection 26 at a lower portion 42 of the seatback 10 of the vehicle 12.

Referring again to FIGS. 1-12, the pin 32 for the seat attachment assembly 30 is operable along a longitudinal axis 50 of the pin 32. Additionally, the pin 32 is typically rotationally fixed relative to the riser bracket 24. In this manner, the pin 32 is operable only in an axial direction along the longitudinal axis 50 of the pin 32. To assist in the axial operation of the pin 32, the pin 32 includes an angled end 52 that is configured to slidably engage the angled channel 38 of the seat bracket 36. Accordingly, when the seat bracket 36 is moved against the riser bracket 24, the angled channel 38 of the seat bracket 36 engages the angled end 52 of the pin 32. The slidable engagement 46 of these two sloped surfaces act in cooperation to bias the pin 32 away from the securing position 34 and to a displaced position 54. When the seat bracket 36 is in an attached position 44, the pin 32 is aligned with the securing aperture 40 of the seat bracket 36. Through this alignment, this pin 32 is able to be biased from the displaced position 54 and back to the securing position 34 and extend through both the riser bracket 24 and the seat bracket 36 of the seatback frame 28. With the seat bracket 36 in the attached position 44 and the pin 32 in the securing position 34, the seatback 10 is secured at the pivot connection 26 defined by the pin 32. The seatback 10 can be rotated about the pin 32 to define the plurality of rotational positions 22 for the seatback 10.

Referring again to FIGS. 5-12, the seat attachment assembly 30 typically includes a housing 60. This housing 60 can be typically attached to a first side 62 of the riser bracket 24. Through this attachment, the housing 60 rotationally secures the pin 32 relative to the riser bracket 24. Additionally, the pin 32 can include an axial ridge 64 (shown in FIG. 12) that engages the housing 60 to rotationally secure the pin 32 within the housing 60. The engagement of the axial ridge 64 with an aligning channel 66 of the housing 60 prevents rotation of the pin 32 within the housing 60. The lack of rotation of the pin 32 allows the angled end 52 of the pin 32 to be in a consistent rotational position 22 to allow for easy engagement between the angled channel 38 of the seat bracket 36 and the angled end 52 of the pin 32 during installation of the seatback frame 28 onto the riser bracket 24.

According to various aspects of the device, the pin 32 can be maintained in a rotationally fixed position to allow for only or primarily axial movement of the pin 32 within the housing 60 through other mechanisms. Such mechanisms can include a pin 32 having a non-circular cross section. In such an embodiment, the pin 32 can have a polygonal cross section or other non-circular cross section that limits rotation of the pin 32 within the housing 60 and/or relative to the riser bracket 24. It is contemplated that various shapes of the pin 32 can be used to provide a single orientation for the pin 32 within the housing 60 and within the riser bracket 24. This single orientation can be used to make the process of installing the seatback 10 onto the riser bracket 24 a consistent procedure where the angled channel 38 and the angled end 52 of the pin 32 are in a consistent position relative to one another. This consistent positioning can make assembly repeatable within an assembly-line setting. This consistent procedure also provides for easier and convenient maintenance and/or replacement of seatbacks 10 during after-market repairs.

Referring again to FIGS. 5-12, the seat attachment assembly 30 can include a biasing spring 80 that is coupled with the pin 32 and biases the pin 32 toward the securing position 34. In the securing position 34, the angled end 52 of the pin 32 extends through the riser bracket 24 and, when the seat bracket 36 is in the attached position 44, also extends through the seat bracket 36. As discussed previously, slidable engagement 46 of the seat bracket 36 with the riser bracket 24 causes the angled channel 38 of the seat bracket 36 to exert an opposing biasing force 82 that overcomes the biasing spring 80 to move the pin 32 away from the securing position 34 and to the displaced position 54. When the pin 32 is moved away from the securing position 34, the seat bracket 36 can be moved into the attached position 44 so that the pin 32 can extend back to the securing position 34 and through each of the riser bracket 24 and the seat bracket 36. The securing position 34 of the pin 32 can be defined through a stopping flange 84 that is included on a portion of the pin 32. The stopping flange 84 is adapted to rest against one of the riser bracket 24 and/or a base plate 86 of the housing 60 to define the securing position 34. The stopping flange 84 prevents axial movement of the pin 32 beyond the securing position 34. The stopping flange 84 can also be used as an attaching point for the biasing spring 80. In such an embodiment, the biasing spring 80 can extend from the stopping flange 84 to an interior surface 88 of the housing 60. The biasing spring 80 biases the stopping flange 84 and the remainder of the pin 32 away from the interior surface 88 of the housing 60 to move the pin 32 to the securing position 34.

To apply additional force to the pin 32 in the direction of the securing position 34, the biasing spring 80 can be maintained in a compressed state 90 while in the securing position 34, where the biasing spring 80 is partially compressed within the housing 60. By maintaining the spring in the compressed state 90, inadvertent or unintentional movement of the pin 32 out of the securing position 34 can be substantially avoided. Additionally, after the seat bracket 36 is in the attached position 44 and the pin 32 extends through the seat bracket 36 to define the securing position 34, the pin 32 can be maintained in this securing position 34 through an attaching feature 92 that is disposed at or near the angled end 52 of the pin 32. Such an attaching feature 92 can be in the form of a weld nut that is welded to a portion of the pin 32 and, according to various aspects of the device, welded to the seat bracket 36 as well. Other attaching mechanisms can include, but are not limited to, threaded engagements, rivets, pins 32, other welding engagements, adhesives, combinations thereof, and other similar fastening mechanisms.

Referring again to FIGS. 2-12, the base plate 86 for the housing 60 can be secured to the riser bracket 24. In this manner, the base plate 86, the housing 60, the pin 32 and the biasing spring 80 are combined as a mechanical assembly that is attached to the riser bracket 24 as a single unit. In this manner, during assembly of the vehicle frame 20, the seat attachment assembly 30 that includes at least the pin 32 and the biasing spring 80 can be included as a single assembly to the riser bracket 24. As discussed above, the seat attachment assembly 30 can also include the housing 60 and the base plate 86. Varying configurations of the seat attachment assembly 30 are possible depending upon the seatback frame 28, the seat bracket 36 and the riser bracket 24.

Figure 2:
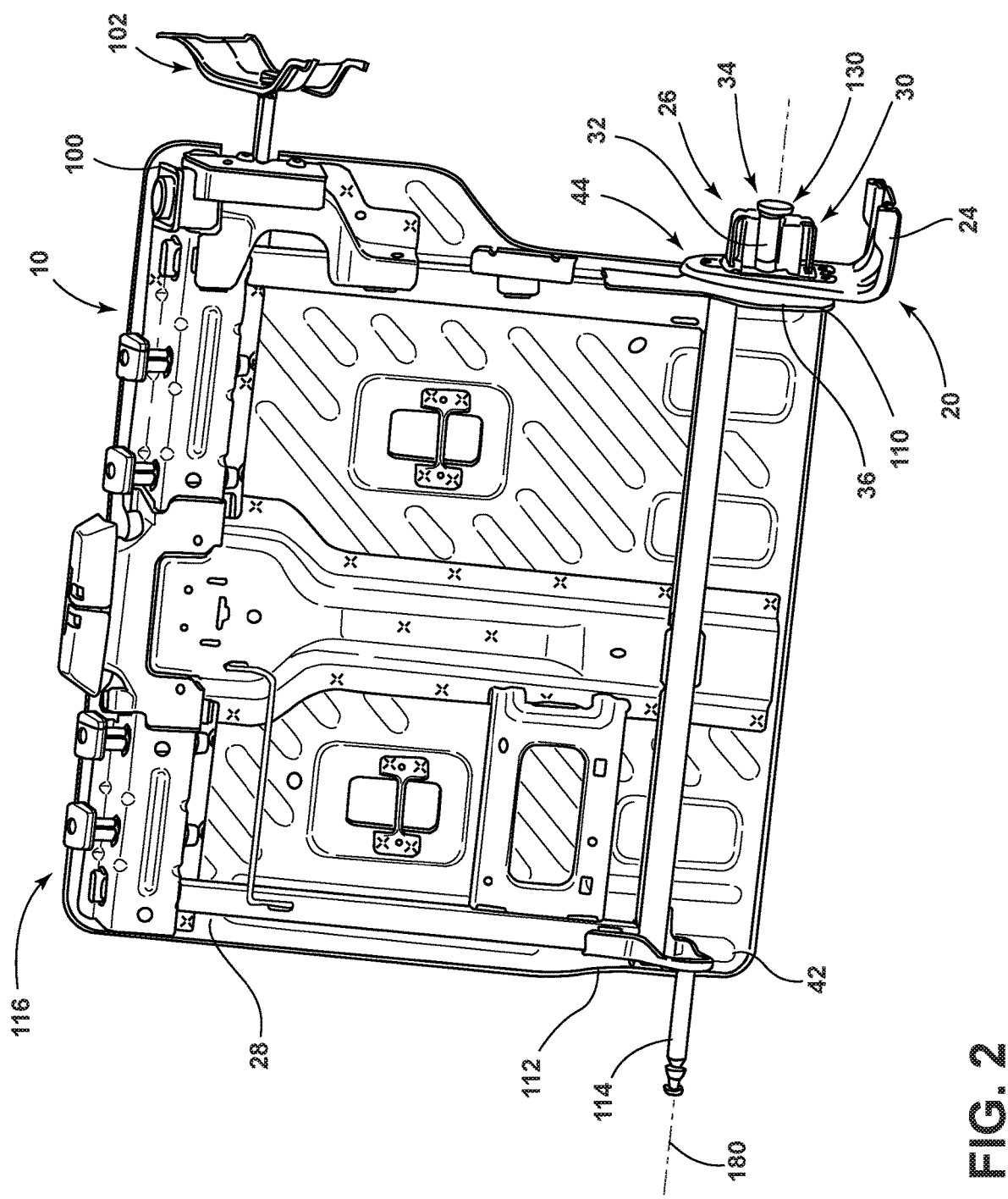
FIG. 2 is a front perspective view of a seatback frame coupled to a riser bracket for a vehicle frame using an aspect of the seat attachment assembly.
Figure 4:
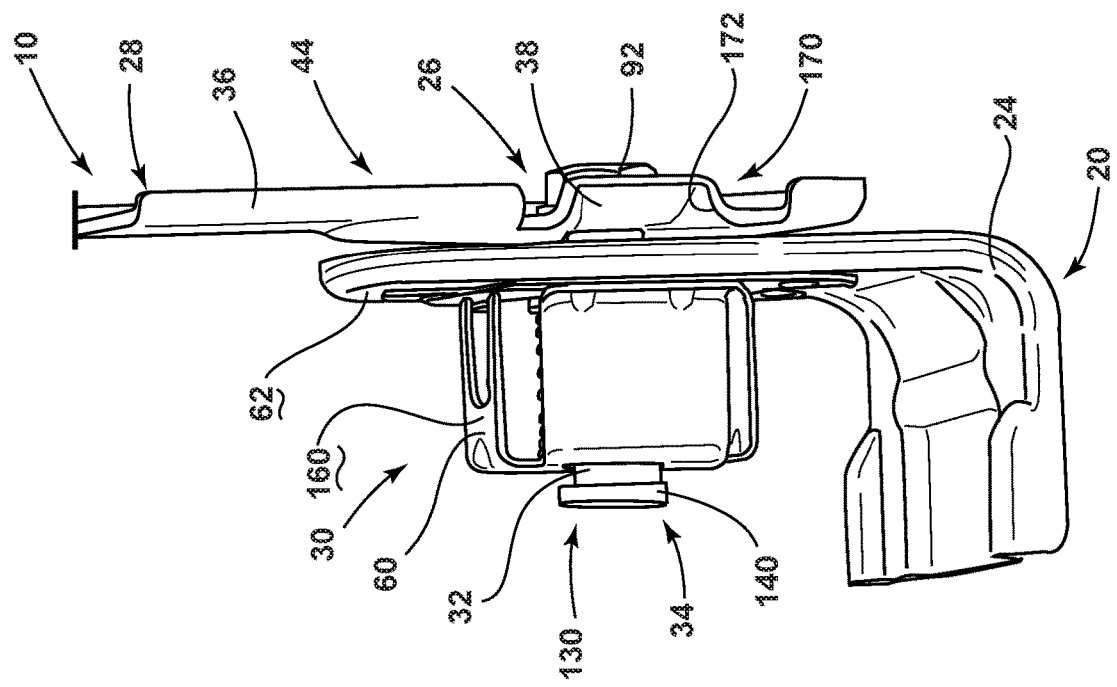
FIG. 4 is a side perspective view of the seat attachment assembly of FIG. 3.
Figure 3:
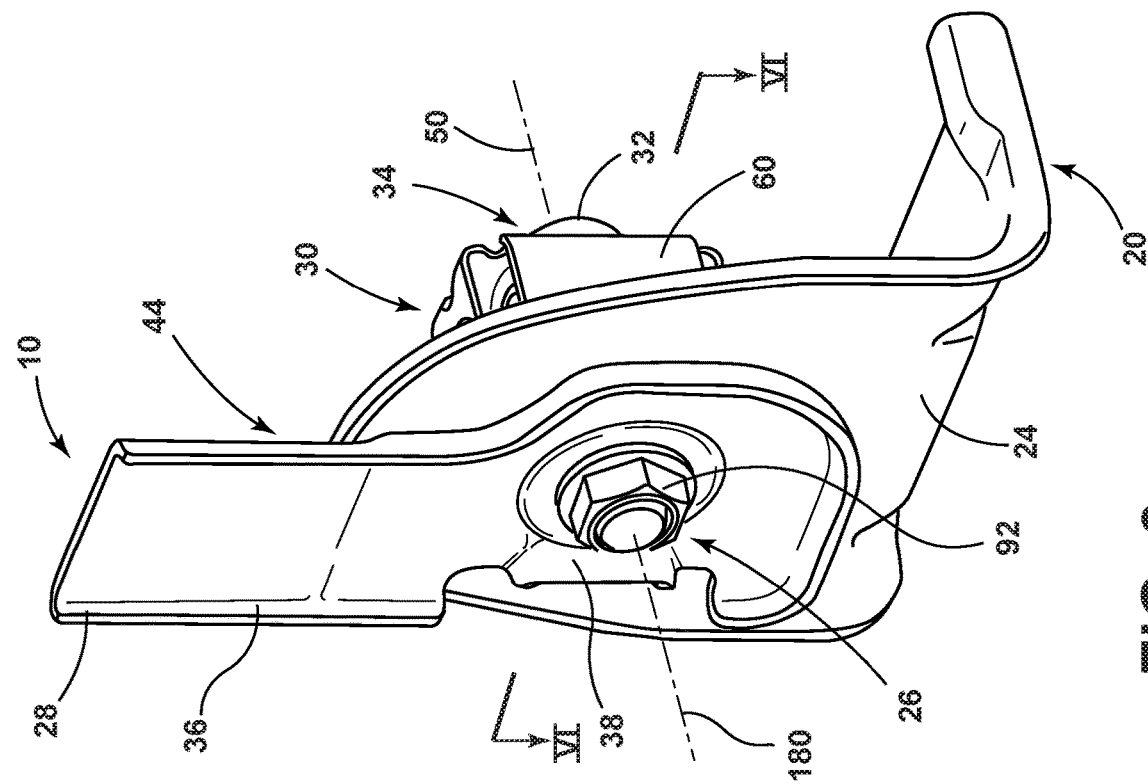
FIG. 3 is a side perspective view of an attachment between the riser bracket of the vehicle frame and the seatback frame using an aspect of the seat attachment assembly.
Figure 5:
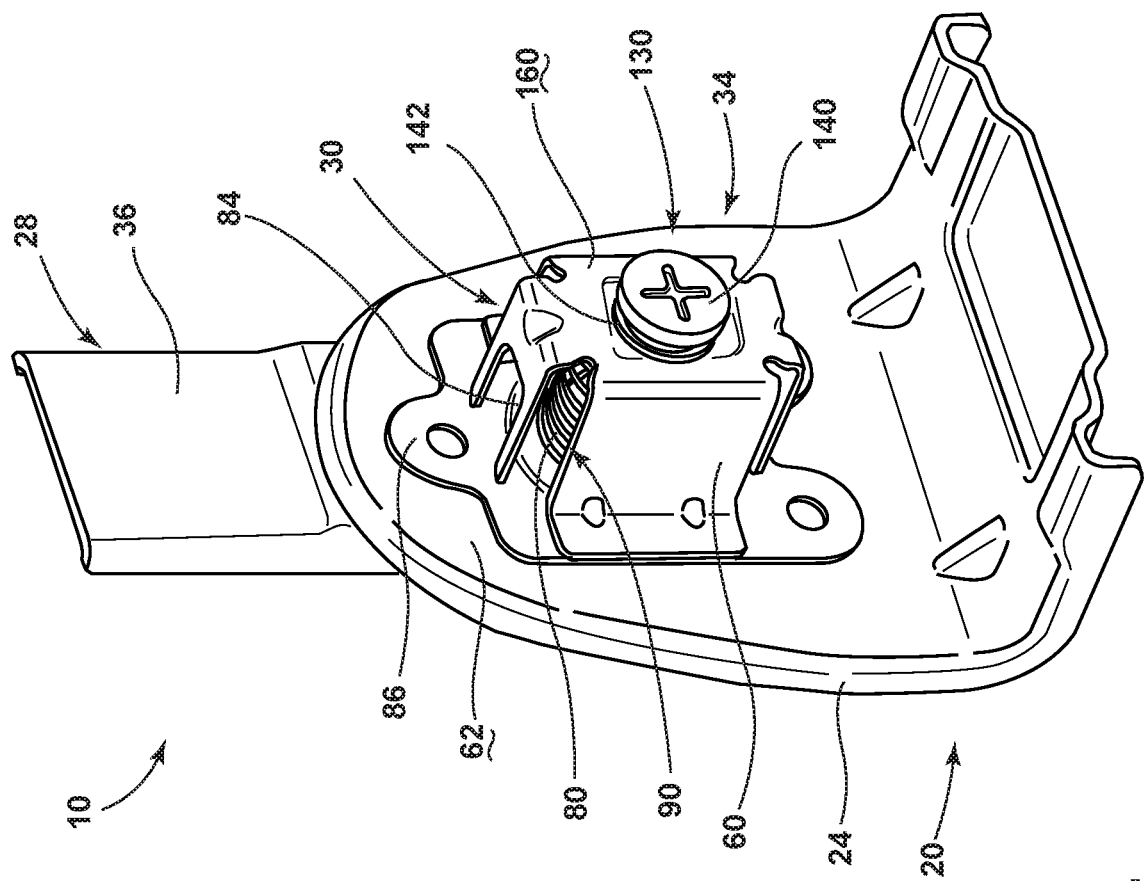
FIG. 5 is a top perspective view of the seat attachment assembly of FIG. 3.
Figure 7:
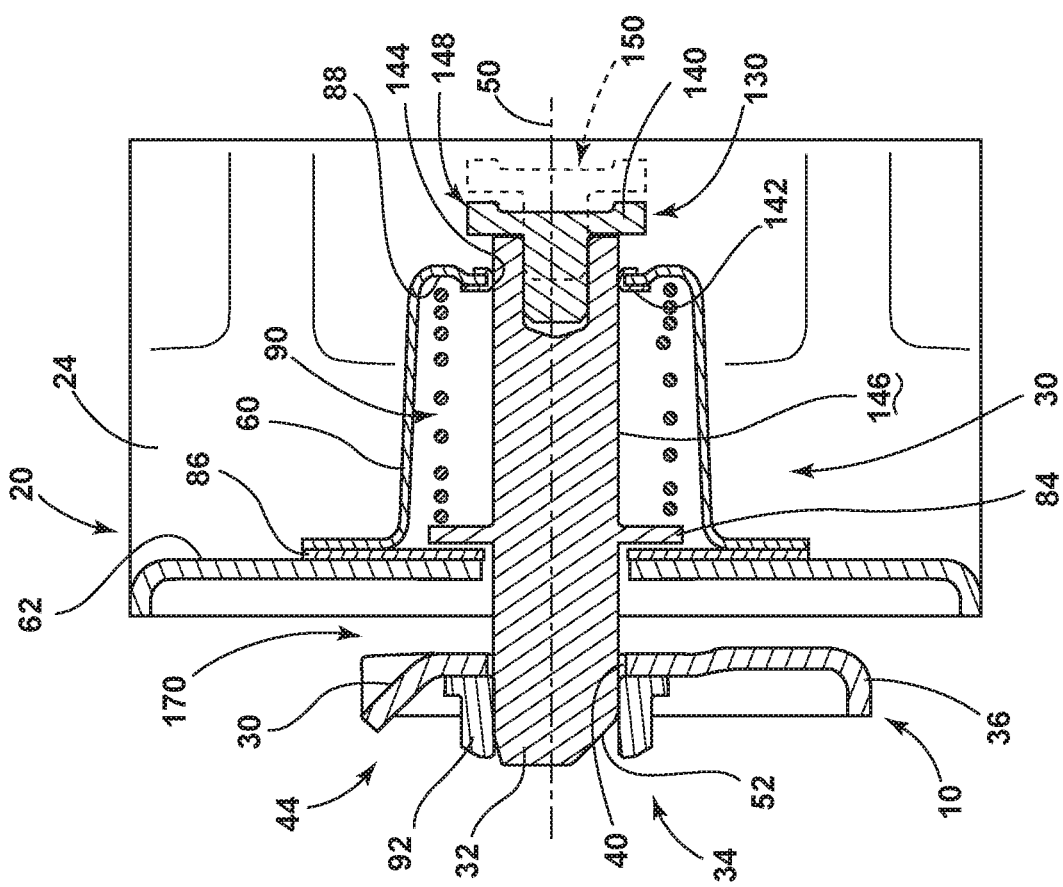
FIG. 7 is a cross-sectional view of the seat attachment assembly of FIG. 6.
Figure 6:
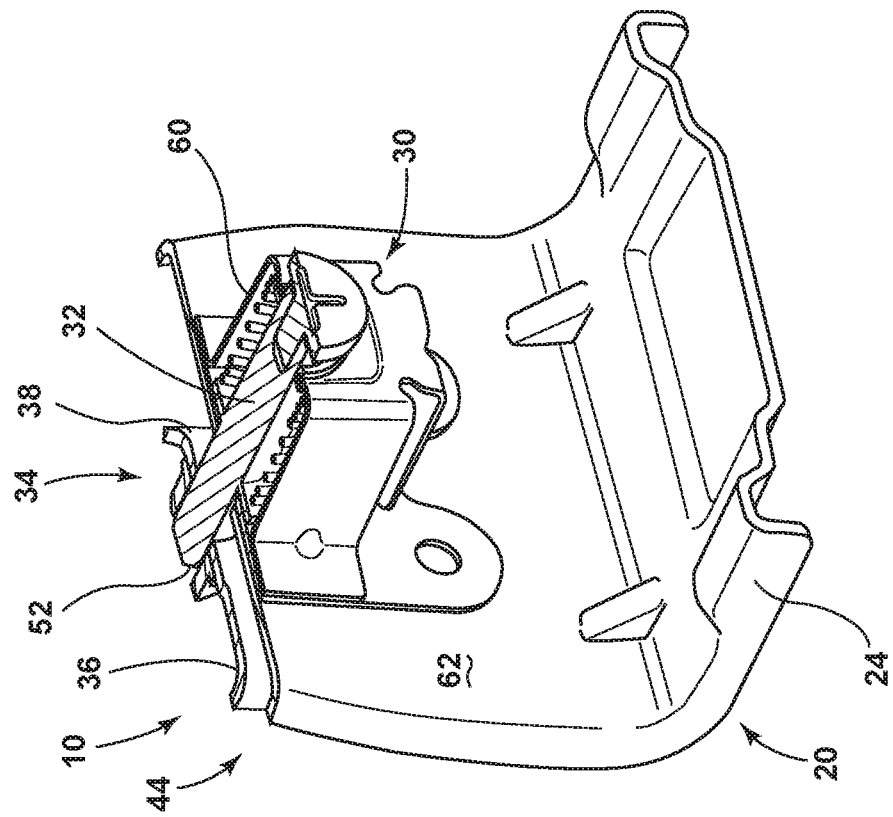
FIG. 6 is a cross-sectional perspective view of the seat attachment assembly of FIG. 3 taken along line VI-VI.
Figure 11:
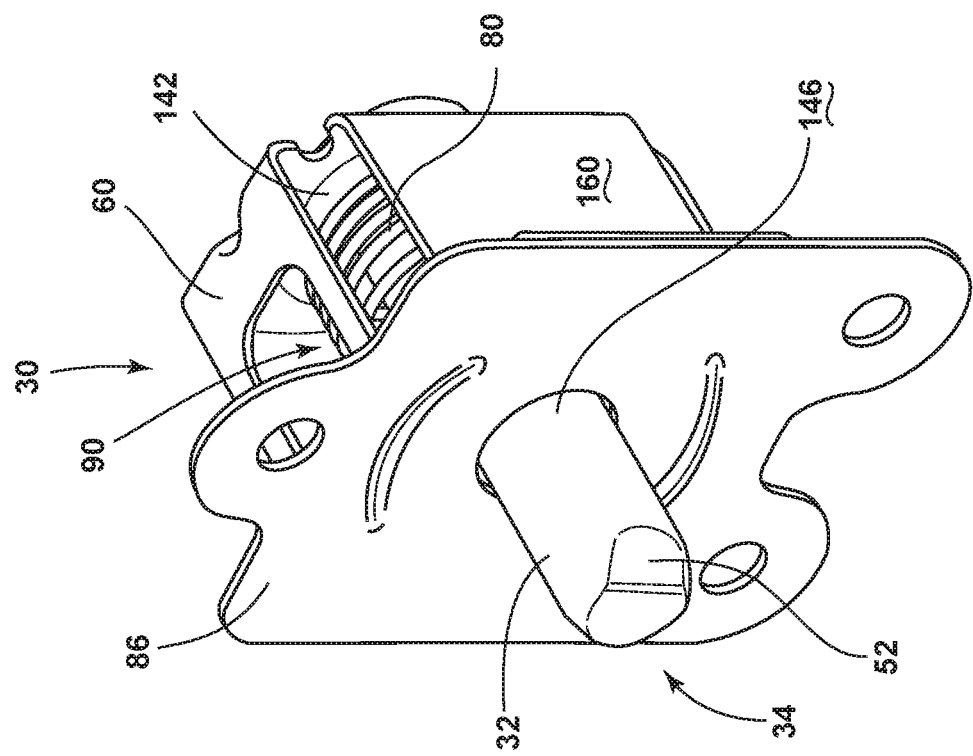
FIG. 11 is a top perspective view of the seat attachment assembly of FIG. 10.
Figure 10:
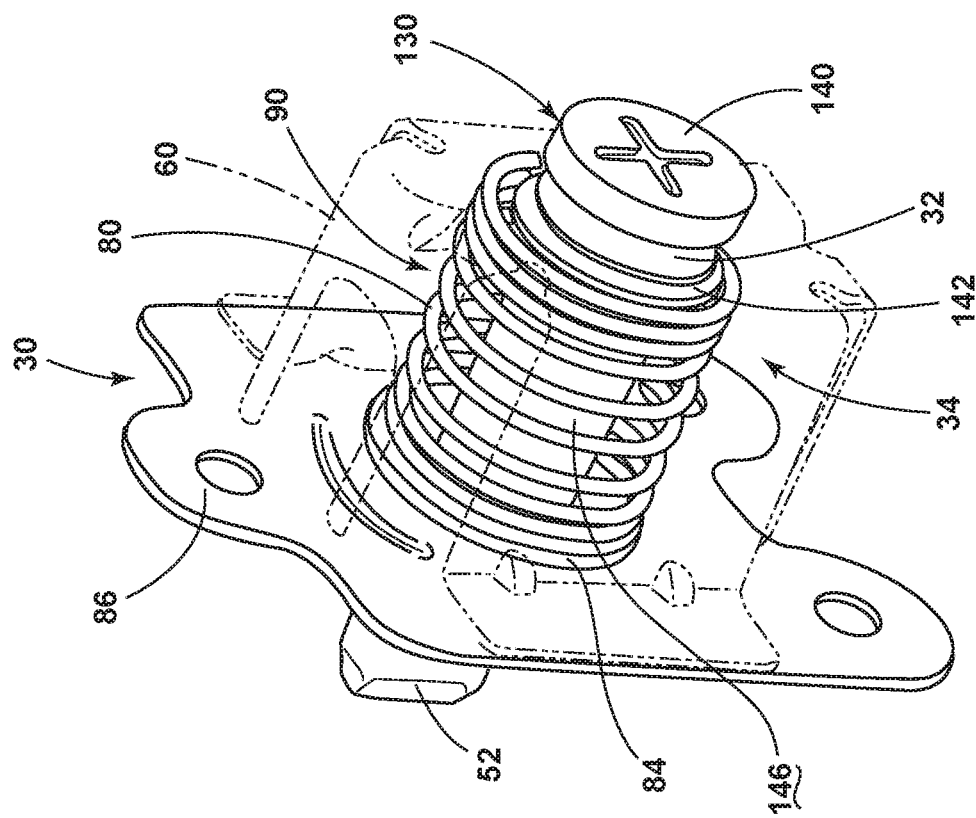
FIG. 10 is a detail perspective view of the seat attachment assembly separated from the riser bracket.
Figure 12:
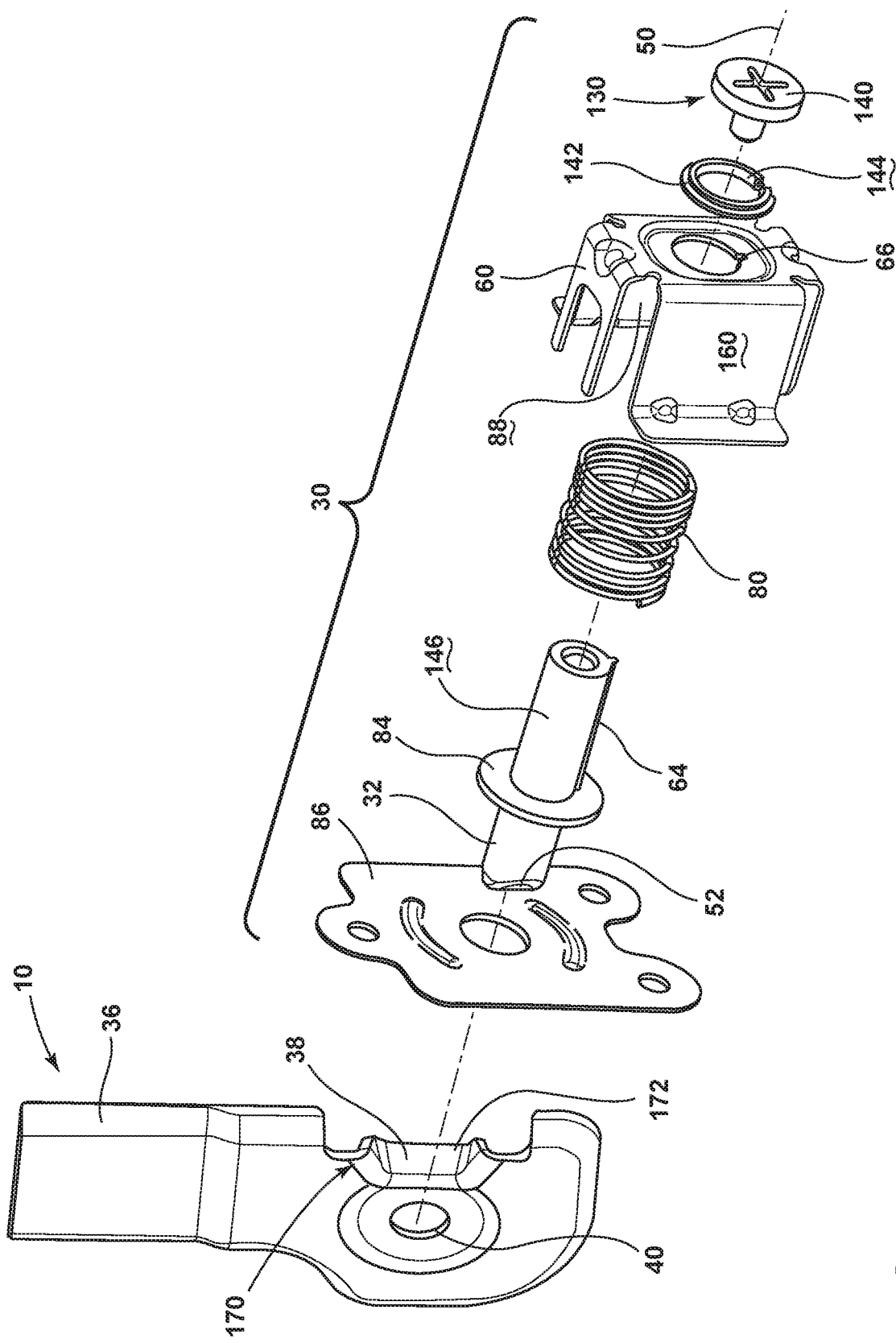
FIG. 12 is an exploded perspective view of the seat attachment assembly of FIG. 5.
Figure 13:
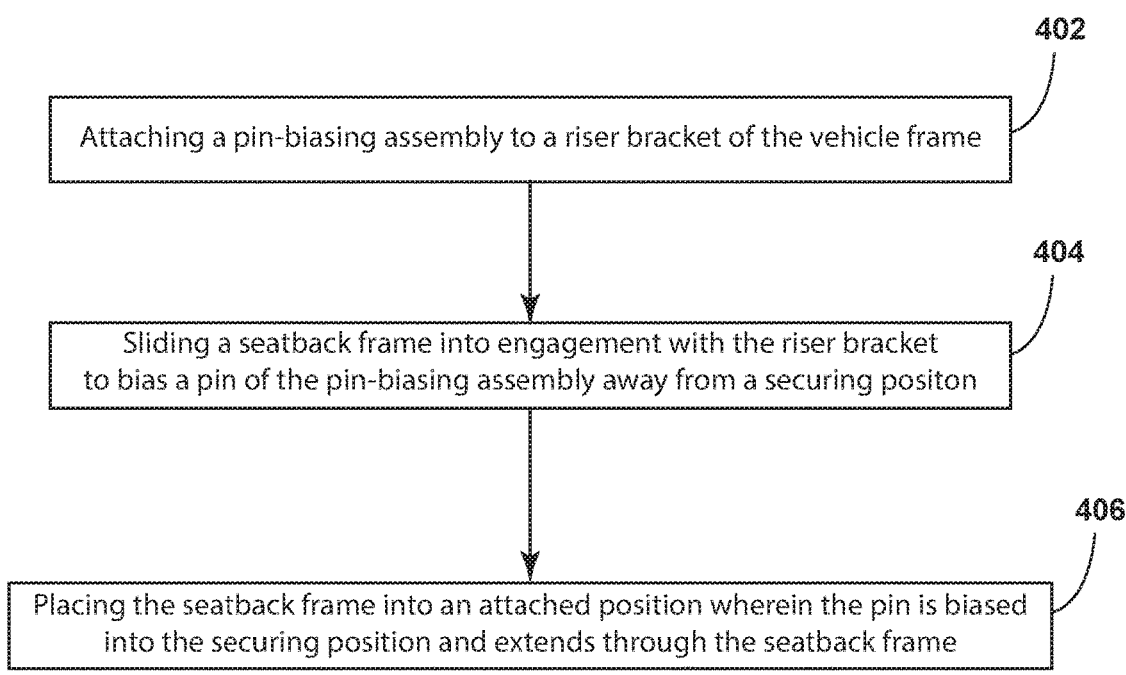
FIG. 13 is a schematic flow diagram illustrating a method for attaching a vehicle seat to a vehicle frame, using an aspect of the seat attachment assembly.

As exemplified in FIGS. 1 and 2, after the seat attachment assembly 30 is coupled with the riser bracket 24 of the vehicle frame 20, the seat bracket 36 can be moved into slidable engagement 46 with the riser bracket 24. This slidable engagement 46 is used to install the seat bracket 36 at the pivot connection 26 defined by the pin 32. As discussed previously, engagement between the seatback frame 28 and the riser bracket 24 via the pin 32 defines the pivot connection 26 of the seatback frame 28 at the riser bracket 24.

Additional installation of the seatback frame 28 can include an engagement between an upper portion 100 of the seatback 10 and the vehicle frame 20. The upper portion 100 of the seatback 10 can include an additional fastening bracket 102 that can be coupled with the seatback 10 to rotationally secure the seatback frame 28 relative to the vehicle frame 20. Typically, the seatback frame 28 will first be installed at the riser bracket 24. Subsequently, it is typical that the upper portion 100 of the seatback frame 28 will be attached to the vehicle frame 20. The engagement between the upper portion 100 of the seatback frame 28 and the vehicle frame 20 can be a selective engagement so that this engagement can be selectively disengaged to allow for rotational movement of the seatback frame 28 relative to the vehicle frame 20.

As exemplified in FIGS. 1 and 2, the seatback frame 28 can include a seat bracket 36 along an outer edge 110 of the seatback frame 28. At the inner edge 112 of the seatback frame 28, a post 114 can extend outward to be engaged with another portion of the seat assembly 116 for the vehicle 12. During installation of the seatback frame 28, it is typical that the post 114 will be inserted within a receptacle in an adjacent portion of the seat assembly 116. When this post 114 is inserted within the seat assembly 116, the seatback frame 28 is afforded partial lateral movement. This partial lateral movement is sufficient to define slidable engagement 46 of the seat bracket 36 relative to the riser bracket 24. As discussed previously, the slidable engagement 46 allows for the angled channel 38 of the seat bracket 36 to engage the angled end 52 of the pin 32. Accordingly, when the seat bracket 36 is in the attached position 44, the pin 32 can extend through both the riser bracket 24 and the seat bracket 36 to secure the seat bracket 36 in the attached position 44.

It is also contemplated that the seatback frame 28 can include seat brackets 36 on each side of the seatback frame 28. In such an embodiment, the vehicle frame 20 may include opposing riser brackets 24 that are attached to the vehicle frame 20. Each of the riser brackets 24 can have an independent seat attachment assembly 30 attached to the respective riser bracket 24. In this configuration, the seatback frame 28 can be installed within each riser bracket 24 simultaneously, or sequentially.

As exemplified in FIGS. 2-12, the pin 32 can include a grasping end 130 that is disposed opposite the angled end 52. This grasping end 130 is typically disposed outside of the housing 60. After installation of the seatback frame 28 onto the riser bracket 24, the pin 32 can be removed manually from the securing position 34. The use of the grasping end 130 can be convenient in an after-market repair where the seatback 10 needs to be removed from the vehicle frame 20. By pulling the grasping end 130 so that the pin 32 is moved out of the securing position 34, the pin 32 can be moved out of the securing aperture 40 of the seat bracket 36, and the seat bracket 36 can be slidably removed from the attached position 44. In various aspects of the device, the grasping end 130 can be manipulated by hand and without the use of tools. In various other configurations, a tool for providing additional leverage or force can be used to manipulate the pin 32 and the grasping end 130 out of the securing position 34 for removing the seat bracket 36 from the riser bracket 24.

Referring again to FIGS. 7 and 12, the grasping end 130 of the pin 32 can be a separate threaded cap 140 that can be rotationally and threadably engaged with the pin 32. In this manner, the grasping end 130 and the stopping flange 84 of the pin 32 can be used to secure the pin 32 within the housing 60 and/or between the housing 60 and the base plate 86. Accordingly, the housing 60, base plate 86, pin 32, biasing spring 80, and grasping end 130 can be used in combination to form the seat attachment assembly 30 as a unitary mechanism that can be installed onto a riser bracket 24 of a vehicle 12. Additionally, the grasping end 130, in the form of a threaded cap 140 can be engaged with the pin 32 via a bushing 142 that is coupled to a portion of the housing 60. By using this bushing 142, rotational engagement of the threaded cap 140 with the pin 32 can be achieved in a convenient fashion during manufacture of the seat attachment assembly 30. The bushing 142 also includes a smooth inner surface 144 that allows for convenient sliding engagement of the outer surface 146 of the pin 32 with the inner surface 144 of the bushing 142. By allowing for easy sliding engagement between the pin 32 and the housing 60 through the use of the bushing 142, operation of the pin 32 during installation and removal of the seatback frame 28 can be more readily accomplished during manufacture of the vehicle 12 and after-market conditions.

According to various aspects of the device, the threaded cap 140 that defines the grasping end 130 of the pin 32 can be extendable and retractable relative to the pin 32. Upon installation of the seatback frame 28 with the riser bracket 24, the threaded cap 140 can be fully rotated into a retracted position 148 within the pin 32 such that the threaded cap 140 is positioned at or near the bushing 142 and the outside surface 160 of the housing 60. Upon the need to remove the seatback frame 28 from the riser bracket 24, the end cap can be threadably rotated outward to an extended position 150 and away from the bushing 142. By moving the threaded pin 32 outward to the extended position 150, the grasping end 130 is now positioned away from the housing 60 and provides a larger grasping area to manipulate the pin 32 away from the securing position 34. Additionally, when the threaded cap 140 is moved to the retracted position 148 near the housing 60, this position of the threaded cap 140 can further define the securing position 34, such that the threaded cap 140 is not able to move past the bushing 142 when in the securing position 34.

Referring again to FIGS. 1-12, a vehicle 12 can include the seatback frame 28 that is slidably operable with respect to a vehicle frame 20 to define an attached position 44. The pin 32 for the seat attachment assembly 30 is biased toward the securing position 34 so that the pin 32 extends through the vehicle frame 20, typically the riser bracket 24 of the vehicle frame 20. When the seatback frame 28 is moved toward the attached position 44, such as through slidable engagement 46 between the seatback frame 28 and the vehicle frame 20, a biasing portion 170 of the seatback frame 28 axially biases the pin 32 away from the securing position 34. When the seatback frame 28 is in the attached position 44, the pin 32 is then biased back into the securing position 34. In the securing position 34, the pin 32 extends through the biasing portion 170 of the seatback frame 28 when the seatback frame 28 is in the attached position 44. As discussed previously, the biasing portion 170 of the seatback frame 28 includes the angled channel 38 that extends from a mouth 172 of the seat bracket 36 to a securing aperture 40 disposed within the seat bracket 36 of the seatback frame 28. The mouth 172 of the seat bracket 36 can also serve as a positioning guide to assist an assembly worker or technician in connecting the seatback frame 28 with the riser bracket 24. The engagement of the angled end 52 of the pin 32 with the mouth 172 of the angled channel 38 provides positive feedback about the proper positioning of the seatback frame 28.

The attached position 44 of the seatback frame 28 is further defined by the pin 32 being disposed within the securing aperture 40 of the seat bracket 36. When the pin 32 is in the securing position 34 and the seatback frame 28 is in the attached position 44, the seatback frame 28 is rotationally operable about a pivot connection 26 defined by a pin 32 extending through the seat bracket 36. In aspects of the device where the seatback frame 28 includes a post 114 that opposes the seat bracket 36, the securing aperture 40 of the seat bracket 36 will typically be aligned with the post 114 that is disposed in the opposite side of the seatback frame 28. Through this alignment, the post 114 and the securing aperture 40 can define a rotational axis 180 about which the seatback frame 28 can rotate relative to the vehicle frame 20. Typically, the rotational axis 180 and the longitudinal axis 50 of the pin in the attached position 44 are co-linear axes.

As exemplified in FIGS. 2-12, the pin 32 is operable in an axial direction along the longitudinal axis 50 of the pin 32. Additionally, the pin 32 is configured to be rotationally fixed relative to the vehicle frame 20. This rotationally fixed configuration of the pin 32 can be achieved through a non-circular cross section of the pin 32 or through other geometric features of the pin 32 that prevent rotation of the pin 32 within the riser bracket 24, the housing 60 of the seat attachment assembly 30 and/or the seat bracket 36.

Referring now to FIGS. 1-13, having described various aspects of the seat attachment assembly 30, a method 400 is disclosed for attaching a seatback frame 28 to a vehicle frame 20 using the seat attachment assembly 30. According to the method 400, a pin-biasing assembly, typically in the form of the seat attachment assembly 30, is attached to a riser bracket 24 of a vehicle frame 20 (step 402). As discussed above, the seat attachment assembly 30 can include a housing 60 in a base plate 86. The base plate 86 can be attached to the riser bracket 24 through various attaching mechanisms and methods that can include, but are not limited to, welding, fasteners, rivets, adhesives, combinations thereof and other similar fastening methods and mechanisms. It is also contemplated that the base plate 86 can be integrally formed within the riser bracket 24. In such an embodiment, the housing 60 can be attached to the base plate 86 incorporated within the riser bracket 24 through the various attaching mechanisms and methods described herein.

Referring again to FIGS. 1-13, after the pin-biasing assembly is attached to the riser bracket 24, step 404 of method 400 includes sliding a seatback frame 28 against the riser bracket 24 toward an attached position 44. As discussed previously, slidable engagement 46 of the seatback frame 28 engages an angled channel 38 of the seatback frame 28 with an angled end 52 of the rotationally-fixed pin 32 for the pin-biasing assembly. This slidable engagement 46 biases the pin 32 away from the securing position 34. Accordingly, the slidable engagement 46 between the sloped surfaces of the angled channel 38 of the riser bracket 24 and the angled end 52 of the pin generates the opposing biasing force 82 that overcomes the biasing spring 80 of the pin-biasing assembly.

According to method 400, step 406 includes placing the seatback frame 28 in the attached position 44. In this configuration, the pin 32 is biased into the securing position 34 and extends through the securing aperture 40 of the seat bracket 36 for the seatback frame 28.

Referring again to FIGS. 2-12, the pin 32 can be removed from engagement with the seat bracket 36 through operation of the grasping end 130. As discussed above, the grasping end 130 can be positioned opposite the angled end 52 of the pin 32. The seat bracket 36 is configured to be engaged and disengaged from the riser bracket 24 and the pin-biasing assembly. According to the various aspects of the device, the engagement between the riser bracket 24 and the seatback frame 28 can be performed through the use of the seat attachment assembly 30 by hand and without the use of tools. Disengagement of the seat bracket 36 from the riser bracket 24 can be accomplished, in certain embodiments, by hand and without the use of tools. Various aspects of the device may utilize an additional tool for added leverage or force to disengage the seat bracket 36 from the riser bracket 24.

According to various aspects of the device, the seat attachment assembly 30 can be used in various seating positions 14 within a vehicle 12. Such seating positions 14 can include, but are not limited to, front-row seating, second-row seating, third-row seating, bench-seating, Captain's chairs, child seating, fixed seats, rotationally operable seats, armrests, combinations thereof, and other similar seating positions 14 and fixtures within the vehicle 12.

According to various aspects of the device, the seat attachment assembly 30 can be coupled with the seat bracket 36. In such an embodiment, slidable engagement 46 between the seat bracket 36 and the riser bracket 24 accomplishes the same function that biases the pin 32 through the seat bracket 36 and the riser bracket 24 to define the pivot connection 26 around which the seatback frame 28 rotates relative to the vehicle frame 20. Where the seat attachment assembly 30 is coupled with the seat bracket 36, the angled channel 38 can be positioned within the riser bracket 24 and the angled end 52 of the pin 32 slidably engages the angled channel 38 of the riser bracket 24 when the seat attachment assembly 30 is coupled with the seat bracket 36. Typically, the seat attachment assembly 30 is attached to the riser bracket 24.

The biasing mechanism disposed within the housing 60 can typically be in the form of a biasing spring 80. Other biasing mechanisms can be included within the housing 60. Such biasing mechanisms can include, but are not limited to, elastomeric members, other types of springs, pre-tensioned members that are biased toward the securing position 34, combinations thereof, and other similar biasing mechanisms.

It is to be understood that variations and modifications can be made on the aforementioned structure without departing from the concepts of the present invention, and further it is to be understood that such concepts are intended to be covered by the following claims unless these claims by their language expressly state otherwise.

What is claimed is:

1. A vehicle comprising:
    a vehicle frame;
    a riser bracket that is rigidly fixed with respect to the vehicle frame;
    a pin that is axially biased through the riser bracket to a securing position, the pin being rotationally fixed and axially slidable relative to the riser bracket, and wherein the pin includes an angled end having a planar sloped surface; and
    a seat bracket having an angled channel that extends to a securing aperture, wherein:
        slidable engagement of the angled channel with the pin, along a predetermined rotational orientation of the seat bracket with respect to the riser bracket, is configured to bias the pin away from the securing position until the pin reaches the securing aperture wherein the pin returns to the securing position;
        the planar sloped surface of the pin selectively aligns with the angled channel to define the predetermined rotational orientation of the seat bracket with respect to the riser bracket and the slidable engagement; and
        engagement between the seat bracket and the riser bracket via the pin defines a pivot connection of the seat bracket at the riser bracket.

2. The vehicle of claim 1, wherein the pin is operable only in an axial direction along a longitudinal axis of the pin, wherein an axial ridge of the pin maintains the pin as rotationally fixed and axially operable with respect to the riser bracket.

3. The vehicle of claim 1, further comprising:
    a housing attached to a first side of the riser bracket, wherein the housing rotationally secures the pin relative to the riser bracket.

4. The vehicle of claim 3, further comprising:
    an axial ridge of the pin that engages the housing to rotationally secure the pin within the housing.

5. The vehicle of claim 3, further comprising:
    a biasing spring disposed within the housing, wherein the biasing spring biases the pin to the securing position.

6. The vehicle of claim 5, wherein the biasing spring defines a compressed state when the pin is in the securing position.

7. The vehicle of claim 6, wherein the pin includes a stopping flange that defines the securing position of the pin.

8. The vehicle of claim 5, wherein the housing includes a base plate that is secured to the riser bracket.

9. The vehicle of claim 8, wherein the base plate, the housing, the pin and the biasing spring are a mechanical assembly that is attached to the riser bracket as a single unit.

10. The vehicle of claim 3, wherein the pin includes a grasping end that is opposite the angled end, wherein the grasping end is disposed outside of the housing.

* * * * *